United States Patent [19]

Levinson et al.

[11] Patent Number: 5,223,291
[45] Date of Patent: Jun. 29, 1993

[54] MICROWAVE-CORE-HEATING AND COOKING PASTA, PULSES, GRAINS AND CEREALS

[76] Inventors: Seth A. Levinson, 140 W. Willow St., Colonia, N.J. 07067; Melvin L. Levinson, 8 Stratford Cir., Edison, N.J. 08820

[21] Appl. No.: 810,823

[22] Filed: Dec. 20, 1991

[51] Int. Cl.⁵ .............................................. H05B 6/00
[52] U.S. Cl. .................................. 426/241; 426/242; 426/243
[58] Field of Search ............... 426/243, 241, 242, 557, 426/523

[56] References Cited

U.S. PATENT DOCUMENTS

| | | | |
|---|---|---|---|
| 4,906,806 | 3/1990 | Levinson | 426/243 |
| 5,008,024 | 4/1991 | Watkins | 426/243 |

OTHER PUBLICATIONS

A package for Rice-A-Roni (Quaker Golden Grain Company) containing cooking instructions.

*Primary Examiner*—George Yeung
*Attorney, Agent, or Firm*—Harry B. Keck

[57] ABSTRACT

Novel food products are disclosed which result from microwave-core-heating of dried foods such as pasta, beans, rice, cereal and pulses. The dried, raw foods are piled in a container and placed in a microwave oven chamber. The raw foods are exposed to microwave energy until they become browned and develop a toasty taste which is different from the taste of the dried, raw food products. The microwave cooking kit of U.S. Pat. Nos. 3,985,990 and 4,880,951 is suited for the described core-heating.

17 Claims, 2 Drawing Sheets

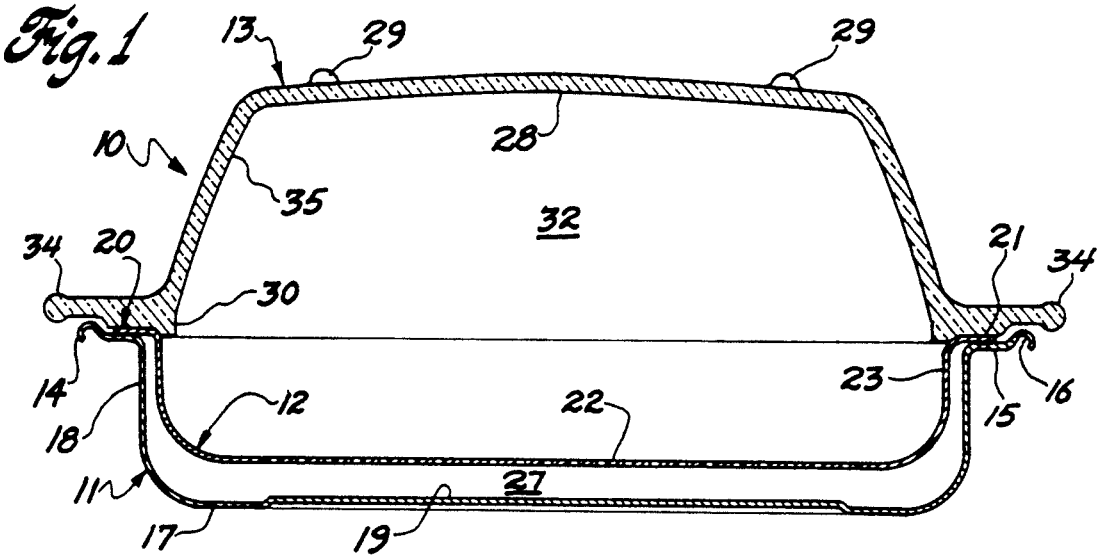
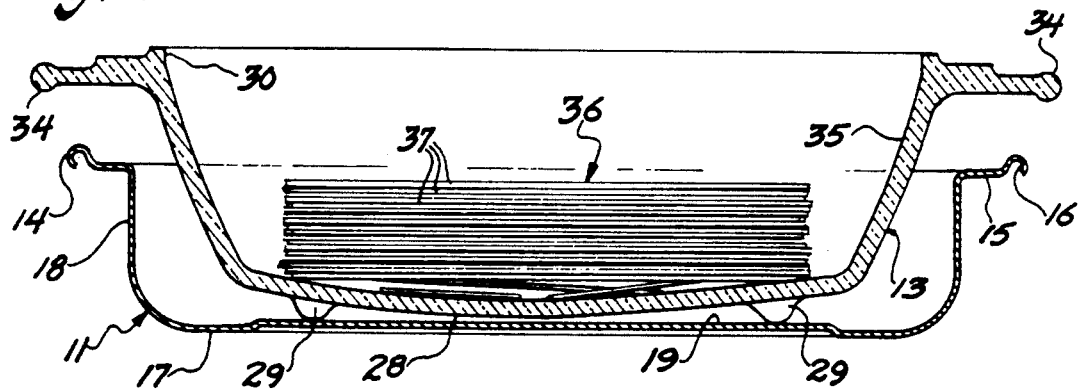
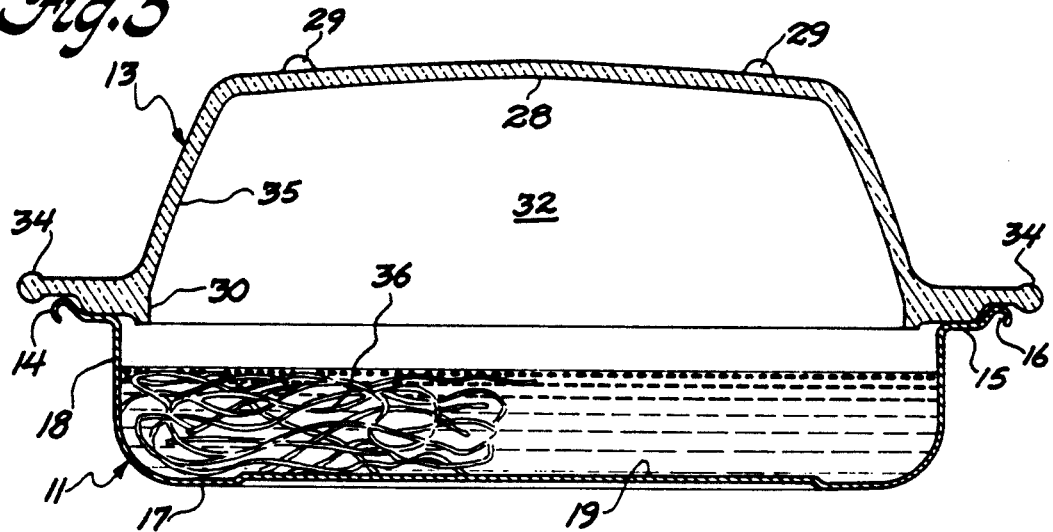

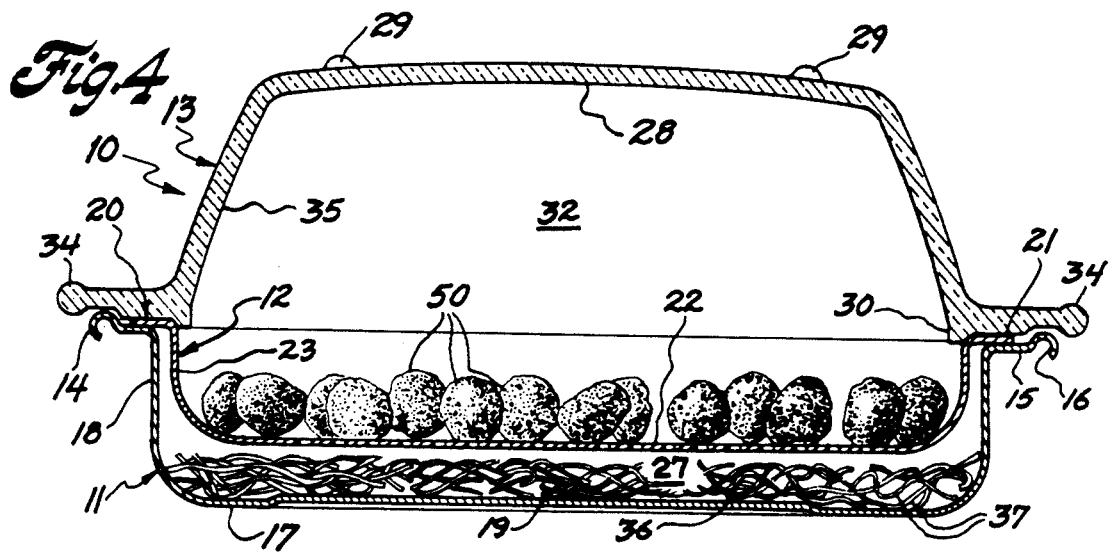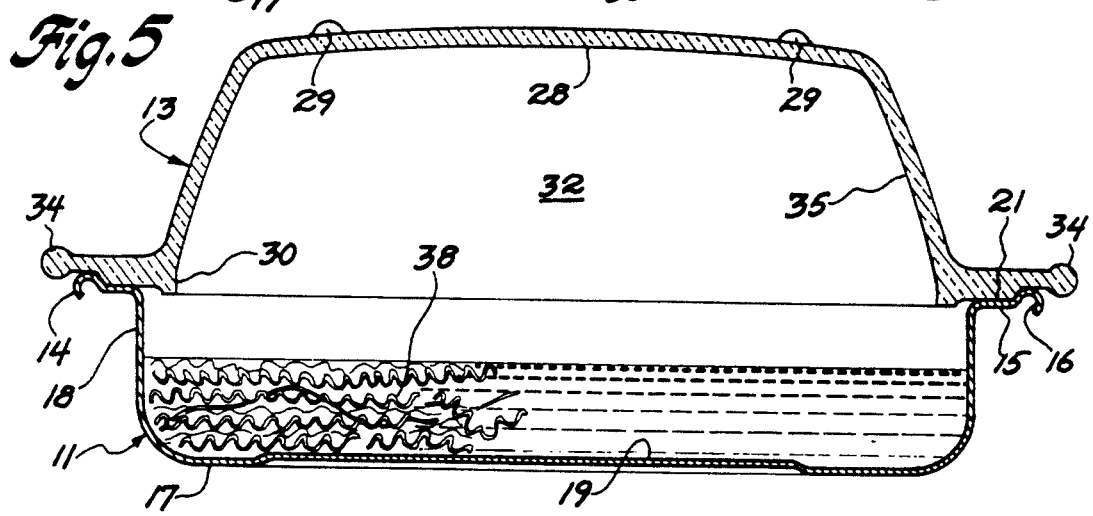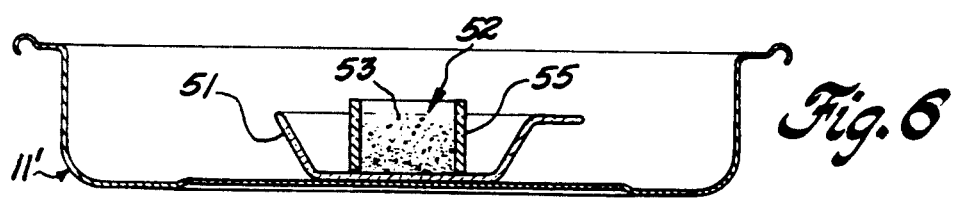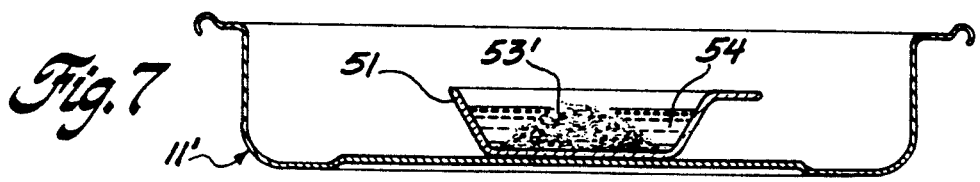

MICROWAVE-CORE-HEATING AND COOKING PASTA, PULSES, GRAINS AND CEREALS

BACKGROUND OF THE INVENTION

Field of the Invention—The present invention concerns methods for preparing pasta, pulses, grains and cereals in a microwave chamber and, more particularly, to "microwave-core-heating" such foods.

Description of the Prior Art—Microwave radiation can result in heating the core of a microwave-lossy, microwave-permeable article. In contrast, infra-red radiation heats the surface of an article regardless of its composition.

Microwave heating can result in heating the core of an article more rapidly than the surface of the article. Within a microwave chamber, the surface of an article loses heat to the cool walls of the chamber and to the relatively cool air within the microwave chamber. The core of an article (e.g., food) is not exposed to cool microwave oven walls and cool air, and accordingly heats rapidly.

The microwave-core-heating develops internal vapor pressure which drives contained water to the food surface where a surface blanket of moisture forms. The surface temperature cannot increase significantly above 212° F. so long as the moisture coexists at the surface.

U.S. Pat. No. 4,103,431 describes microwave-core-heating and uniform three dimensional drying (for example, melba toast, a uniformly toasted product). A heat insulating, pressure regulating structure is described in that patent.

Prior art cooking of pastas, pulses, grains and cereals in microwave chambers have concerned:
1. Duplicating the normal cooking results which are customarily achieved with gas or electric cooking;
2. Drying;
3. Accelerating familiar cooking processes;
4. Re-heating previously prepared food;
5. Popping corn.

Useful appliances for microwave-core-heating of food are described in U.S. Pat. Nos. 3,985,990, 4,871,892 and 4,880,951 which describe a cooking kit including:
1. An outer metal pot;
2. An inner metal pot or metal rack having a perforated cooking surface fitted into the outer pot;
3. A glass cover;
4. An electric and thermal heat insulating coating protecting the outer metal pot;
5. A condensation chamber between the inner and outer pots that is shielded from exposure to microwave energy.

STATEMENT OF THE INVENTION

The present invention concerns novel food products produced by exposing pastas, pulses, grains and cereals to microwave energy. The invention also concerns methods of producing novel food products using apparatus described in U.S. Pat. Nos. 3,985,990 and 4,880,951.

The invention recognizes that dried foods, i.e., pasta, pulses, grains and cereals, can be microwave-core-heated and thus raised to a temperature which will brown or toast the food in a microwave chamber. Some novel food products of this invention include microwave-core-heated:
1. Pasta
   A. spaghetti, long rods of pasta
   B. lasagna, long, wide, thin strips of pasta
   C. pasta products, various shapes, long or short
2. Cereals, Grains
   A. oats, wheat, corn, previously prepared cereal products
3. Pulses
   A. beans, peas
4. Rice, Seeds or Grains
   A. wild rice, processed rice, sesame seeds, sunflower seeds, peanuts.

A representative list of foods that have been microwave-core-heated using this invention includes:
rice, wild rice, lima beans, black-eye peas, pink beans, chick peas, bean soup mixture, Roman beans, barley, farina, Cream of Wheat TM, rolled oats, Wheatena TM, Oat Bran, H-O Cream TM Farina, hominy grits, grits, lasagna, ditalini, conchiglie, linguini, mafalde, mezzani, small ravioli, spaghetti, vermicelli, ziti, Kashi TM and kasha.

Each of these familiar foods, when microwave-core-heated, will turn brown and develop a toasty taste. The microwave-core-heated food retains the toasty taste through subsequent cooking.

Duration of exposure to microwave energy in a microwave chamber for achieving the desired microwave-core-heating is dependent upon the microwave intensity, the quantity of food and the desired degree of browning or toasting. The food may be coated with or sprayed with edible oils to facilitate uniformity of the browning.

Not all persons will enjoy the altered taste of the browned/toasted food products; some persons will prefer the toasty taste characteristic and/or the different texture.

While no particular utensils are required to achieve the novel browning characteristics, there are some benefits, which result from using microwave cooking kits, described in U.S. Pat. Nos. 3,985,990 and 4,880,951.

SUMMARY OF THE INVENTION

The objectives of this invention include:
1. To microwave-core-heat dry food in a pile to a temperature high enough to cause browning of, at least, a portion of the dry food.
2. To microwave-core-heat a dry food and then cook it by exposing the food to microwave energy in the same utensil.
3. To microwave-core-heat and brown a pasta product, having one dimension one inch or longer, i.e., spaghetti, and subsequently, to cook the microwave-core-heated pasta in the same utensil.
4. To employ a means, e.g., a fence, for containing dry food in a pile while microwave-core-heating the dry food.
5. To apply edible oil on the surface of dry food pieces prior to microwave-core-heating the dry food pieces in a pile.
6. To cook by microwave energy, in one utensil, a meat product and a core-heated pasta product.

DESCRIPTION OF THE DRAWINGS

FIG. 1 is a cross section illustration of elements of a microwave cooking kit as described in U.S. Pat. Nos. 3,985,990 and 4,880,951.

FIG. 2 is a cross section view of a cover member and base pan from the kit of FIG. 1 containing food to be microwave-core-heated.

FIG. 3 is a cross section view of two of the elements of the kit of FIG. 1 showing food undergoing cooking.

FIG. 4 is a cross section illustration of the kit of FIG. 1 showing food undergoing cooking.

FIG. 5 is a cross section view of a cooking assembly of a cover and outer metal pot containing microwave-core-heated food to be microwave-cooked.

FIGS. 6 and 7 are cross section views of a ceramic bowl in which food may be microwave-core-heated (FIG. 6) and thereafter microwave-cooked (FIG. 7).

DESCRIPTION OF THE PREFERRED EMBODIMENTS

The cooking kit 10 of FIG. 1 includes a metal outer pot 11, a metal inner pot 12 and a microwave-permeable cover 13, preferably made from heat resistant glass or ceramic material. The outer metal pot 11 has an upper rim 14 with an outward shoulder 15 and a terminal bead 16. The outer metal pot 11 has a generally flat base 17, upstanding side walls 18 and a raised platform 19 on the base 17. The area defined by the upper rim 14 comprises a means for admitting microwaves into the interior of the outer metal pot 11.

The inner metal pot 12 has an upper rim 20 with an outward flange 21, a generally flat base 22 and upward side walls 23. The base 22 contains multiple perforations (not shown) of sufficient size to permit gases and liquids to pass through the perforations but to preclude passage of microwaves. The three elements of the cooking kit 10 provide several combinations as sub-assemblies which are useful in the practice of this invention.

A metal shielded chamber 27 between the pots 11, 12 receives cooking juices and condensates from cooking food. Microwaves do not penetrate the metal walls of the shielded chamber 27.

The microwave-permeable cover 13 has a base 28, pedestals 29 for supporting the cover 13 in its rim-up position (See FIG. 2), and side walls 35, a rim 30 and handles 34. The cover 13 combines with the inner pot 12 to define a cooking chamber 32 in FIGS. 1 and 4. The cooking chamber 32 in FIGS. 3 and 5 is defined by the cover 13 and the outer pot 11. The cover 13 (FIG. 1) is microwave-permeable and comprises a means to admit microwaves into the outer metal pot 11.

In FIG. 2 the cover 13 in its inverted position (rim-up) contains a pile 36 of pasta 37 (spaghetti or noodles). Preferably the cover 13 is nested in a metal outer pot 11 to shield the pile 36 from microwave penetration from the sides, ends or bottom. According to the invention, the inverted cover 13 with a pile of the spaghetti or noodles is placed in a microwave chamber and heated for a sufficient time until at least a portion of the core of the pile 36 of pasta 37 reaches a browning temperature of the spaghetti or noodles. The uniformity of browning can be improved by applying a small amount of oil as a surface coating for the individual pieces of spaghetti or noodles. By placing the glass cover 13 in the bottom pan 11, the microwaves cannot penetrate the pile 37 from the bottom, ends or sides of the pile that are in close proximity to the metal pan; instead the microwaves enter the pile 36 predominantly from the open top of the cover 13. This avoids overheating the ends or sides of the pile 36 and tends to develop uniform heating of the pile 36.

After the pasta 37 has been microwave-core-heated, as described in connection with FIG. 2, the core-heated pasta (FIG. 3) is deposited in the outer metal pot 11. Enough water, to submerge the spaghetti or noodles, is added to metal pot 11 and the spaghetti or noodles is exposed to microwave energy until cooked as desired. The spaghetti or noodles thereafter is drained. Draining can be accomplished with the aid of the inner perforated pot 12.

The drained pasta 37 may be retained in the base of the outer metal pan 11 and the perforated inner pan 12 is installed as shown in FIG. 4. Meatballs 50 or other meat products are placed on the perforated surface 22 and the cover 13 is replaced. The assembly of FIG. 4 is returned to a microwave chamber to cook the meatballs 50. Juices from the meatballs 50 drain through the perforations of the inner pot base 22 and mingle with the cooked pasta. After the meatballs 50 are cooked, the assembled kit 10 is removed from the microwave chamber, the meatballs 50 are removed, the pasta 37 is again drained and the food is ready for serving, i.e., meatballs 50, cooked pasta 37 which has been browned/toasted by core-heating, then cooked and finally mixed with juices of cooking meat. Pasta sauces and seasonings may be added to the drained pasta as desired.

LASAGNA LOAF

Lasagna noodles (wide, flat noodles) can be core-heated as described and used in a lasagna loaf as illustrated in FIG. 5.

Core-heated lasagna noodles can be layered with meat, cheese, tomatoes, etc., to prepare a lasagna loaf 38. The cover 13 is placed on the outer metal pot 11 and the assembly is placed in a microwave chamber to cook the lasagna loaf 38. It will be observed that microwave energy can penetrate only from the top, i.e., through the microwave transparent cover 13. The outer metal pot 11 reflects microwaves and prevents heating through the bottom and sides of the cooking chamber 32. One novel feature of the FIG. 5 assembly is the use of the microwave-core-heated pasta for preparing the novel lasagna loaf. The resulting lasagna loaf will have a novel toasty taste. Another novel feature is the use of a metal pot to cook a lasagna in a microwave chamber.

RECIPE

One recipe for a microwave cooked, microwave-core-heated, meat lasagna:

INGREDIENTS:

6 ounces dried lasagna noodles
1 ounce cooking oil
2 cups room temperature water
½ tsp. salt
4 ounces frozen ground beef
4 ounces tomato sauce
6 ounces mozzarella cheese
1 Tbs. Parmesan cheese
1 fresh green pepper
6 whole mushrooms

UTENSIL

"Magnawave Perfection Microwave Roaster" consisting of "ceramic on steel" base pot, an aluminum perforated tray that nests into the base pot, and a heat-resistant glass cover ("Magnawave Perfection" is a Trademark of General Housewares Corporation, Stamford, Conn.).

DIRECTIONS

Coat the lasagna noodles with cooking oil;
Stack the coated noodles in the metal base pan 11;

Place base pan 11 containing the coated noodles and a glass cover 13 in a microwave chamber, and expose to microwaves for three (3) minutes (700 watt microwave, on high) or until desired browning/toasting is achieved for the noodles;

Add water and salt to the microwave-core-heated noodles in the base, and, expose to microwave energy, with glass cover in place, for fifteen (15) minutes (700 watt microwave, on high) or until noodles are cooked to a desired texture, e.g., al dente;

Install a metal perforated pan 12 into the base of the metal base pan 11 above the water and noodles, and place the frozen ground beef on the pan 12;

Replace the glass cover and expose the assembly to microwaves for three (3) minutes;

Remove the cooked beef and break into meat crumbs;

Drain the water and beef fat from the lasagna noodles;

Note: The outer pan 11 can be tipped without spilling noodles when the inner pot 12 is held in place.

Assemble a lasagna loaf in the base pot as follows:

Place a layer of noodles in the base pan, add cheese, meat, green peppers, mushrooms and tomato sauce; add additional layers of noodles with intermediate layers of cheese, meat, green peppers, mushrooms, tomato suace; top with remaining cheese and tomato sauce;

With glass cover in place, expose the assembly of outer pan 11 and glass cover 13 to microwave energy for six (6) minutes.

The lasagna is ready to serve.

As an alternative to FIG. 2 the spaghetti or noodles can be microwave-core-heated directly in a metal base pan 11, i.e., with or without the glass cover 13.

OTHER PRODUCTS

Referring to FIG. 2, it is possible to replace the pasta 37 with other foods such as rice, beans, peas, cereals to effect a microwave-core-heating of those food products and a desirable browning/toasting. The resulting browned/toasted food products may be final cooked using selected elements of the cooking kit of FIG. 1.

RICE

Rice, white or brown, may be toasted in the inverted cover 13 as shown in FIG. 2 or in the outer metal pot 11 with or without the cover 13 in position. After the rice has been microwave-core-heated sufficiently to achieve a desirable toasty flavor, the rice may be further cooked by adding water to the container and returning the microwave-core-heated rice and water to a microwave oven for cooking the rice. Preferably the rice is cooked, in water, after microwave-core-heating, in the kit elements, as shown in FIG. 3, i.e., the metal outer pot 11 with the cover 13 in place.

CEREALS

Oatmeal, farina and some prepared cereals such as Cream of Wheat TM, Wheatena TM, and hominy grits may benefit from the present microwave-core-heating treatment. A supply of the dry cereal is placed in a container such as the inverted cover 13 of FIG. 2 or outer metal pot 11 of FIG. 5. The cereal is exposed to microwave energy until an appropriate browning is achieved. Thereafter the cereal is mixed with sufficient water for cooking and is returned to the microwave chamber for preparation. If a small quantity of toasted cereal is desired, for example, a cereal service for one individual, the microwave-core-heating and final cooking may be carried out in a smaller container (FIG. 6) in the same bowl in which the core-heated, cooked cereal will be served to the individual. A bowl 51 preferably is positioned within an outer metal pot 11' shown in phantom outline in FIGS. 6, 7.

A ceramic or glass bowl 51 holds a pile 52 of cereal or rice or other toastable food 53 contained within a microwave-permeable fence 55 which may be a plastic or glass or ceramic sleeve. The bowl 51 is placed in a microwave chamber to core-heat the pile 52 to produce browned/toasted food. Thereafter the fence 55 is removed and water or other cooking liquid 54 is added to the browned/toasted food 53' in the same bowl 51 and the mixture (FIG. 7) is returned to a microwave chamber for cooking the browned/tasted food 53'.

BEANS AND PEAS

Beans and peas can be subjected to microwave-core-heating for browning/toasting. A supply of dried peas or beans is introduced into a container, preferably the cover 13 or outer metal pot 11 shown in FIG. 1. The peas or beans are exposed to microwaves in a microwave chamber until a desirable browning/toasting is achieved. Thereafter the beans or peas are cooked in a conventional way. For example, the peas or beans may be covered with water and allowed to soak overnight before cooking. Alternatively the peas or beans may be cooked directly in a microwave chamber in one of the cooking kit elements of FIG. 1 such as the cover 13 or the outer metal pot 11. The resulting browned/toasted peas or beans have a novel toasty taste and a brown appearance which results from the microwave-core-heating.

I claim:

1. A method for microwave-core-heating a pile, containing multiple pieces of a dry, raw food product, comprising:

establishing said pile within a utensil having a base and upward sidewalls, said utensil fabricated to permit microwave energy to enter said pile;

exposing said utensil and said pile to microwave energy until a portion of the core of said pile heats to the browning temperature of said food product and develops a toasty taste and appearance at the core which differs from the taste and appearance at the exposed surface of said pile of dry, raw food product.

2. The method of claim 1 wherein the said food material is a pasta.

3. The method of claim 2 wherein the said pasta is spaghetti.

4. The method of claim 2 wherein the said pasta is noodles.

5. The method of claim 1 wherein the said food material is rice.

6. The method of claim 1 wherein the said food material is cereal.

7. The method of claim 1 wherein the said food material is a pulse.

8. The method of claim 1 including the additional step of positioning a microwave-permeable fence on said base and confining said pile within said fence.

9. The method of claim 1 wherein said utensil is a microwave-permeable utensil which is placed in a metal utensil and said pile is positioned in said microwave-permeable utensil.

10. The method of claim 9 wherein said metal utensil has an open top and said microwave energy enters said pile through said open top.

11. The method of claim 9 wherein said microwave-permeable utensil has a microwave-permeable removable cover and said microwave energy penetrates said pile through said cover.

12. In the method of claim 1, the additional step of: applying edible oil to the surface of said food material before exposing said pile to microwave energy.

13. In the method of claim 1, the additional step of: cooking the food product of said microwave-core-heating in the same utensil.

14. The method of claim 2 wherein said pasta includes some pieces having one dimension which is larger than one inch.

15. In the method of claim 14 the additional step of: applying edible oil to the surface of said raw pasta material before the microwave-core-heating is completed.

16. The method of claim 14 wherein said pasta material is spaghetti.

17. The method of claim 14 wherein said pasta material is lasagna noodles.

* * * * *